US012747018B1

(12) United States Patent
Christensen

(10) Patent No.: US 12,747,018 B1
(45) Date of Patent: Sep. 29, 2026

(54) AIRCRAFT WHEEL PRELANDING ROTATION DEVICE AND METHOD OF USE

(71) Applicant: David Christensen, Bremerton, WA (US)

(72) Inventor: David Christensen, Bremerton, WA (US)

( * ) Notice: Subject to any disclaimer, the term of this patent is extended or adjusted under 35 U.S.C. 154(b) by 0 days.

(21) Appl. No.: 19/335,809

(22) Filed: Sep. 22, 2025

(51) Int. Cl.
*B64C 25/40* (2006.01)
*B64C 25/36* (2006.01)

(52) U.S. Cl.
CPC .............. *B64C 25/40* (2013.01); *B64C 25/36* (2013.01)

(58) Field of Classification Search
CPC ......... B64C 25/40; B64C 25/36; B60B 19/00; B60C 2200/02
See application file for complete search history.

(56) References Cited

U.S. PATENT DOCUMENTS 1,565,897 A 12/1925 Bouin
1,833,019 A 11/1931 Faucher
2,466,568 A * 4/1949 Bean ........................ B64C 25/40 244/103 S
2,594,202 A * 4/1952 Neechi .................... B64C 25/40 244/103 S
2,665,087 A * 1/1954 Clover .................. B64C 25/405 244/103 S
4,061,294 A 12/1977 Hawkins
4,491,288 A * 1/1985 Sinclair ................... B64C 25/40 244/103 S
D303,106 S 8/1989 Macaluso
5,104,063 A * 4/1992 Hartley ................... B64C 25/40 244/103 S
6,032,900 A 3/2000 Smith
6,499,691 B1 * 12/2002 Lyons ..................... B64C 25/40 244/103 S
11,260,967 B1 3/2022 Davis
2015/0021435 A1 1/2015 Abbasszadeh
2017/0361925 A1 * 12/2017 Pao ......................... B64C 25/40

FOREIGN PATENT DOCUMENTS

DE 102010045148 A1 * 3/2012 ........... B64C 25/405
FR 2123158 A6 * 9/1972 ............. B64C 25/40

* cited by examiner

*Primary Examiner* — Arfan Y. Sinaki

(57) ABSTRACT

An aircraft wheel prelanding rotation device for rotating a wheel of an aircraft prior to landing includes a disc, a shell, and a tube. The disc has inner and outer faces. A coupler attached to the disc couples the disc to a hub of the wheel so that the inner face abuts the hub and the axle extends axially through the disc. The shell is bowl shaped and thus has an open face. An opening extends axially into the shell and receives the axle to fixedly attach the shell to the axle with the open face positioned adjacent to the hub. Slots extends into the shell to vent of the shell. A tube is attached to the shell and extends from an inlet in the shell. The tube directs air over veins attached to the disc to apply torque to the hub to rotate the wheel.

12 Claims, 6 Drawing Sheets

AIRCRAFT WHEEL PRELANDING ROTATION DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to wheel rotation devices and more particularly pertains to a new wheel rotation device for rotating a wheel of an aircraft prior to landing. The wheels of an airplane are not motorized and do not rotate significantly prior to making contact with the ground. As such, wheel contact is damaging to tires and a device that causes the wheel to rotate prior to landing would minimize tire wear and maximize useful life for the tire.

(2) Description of Related Art Including Information Disclosed Under 37 CFR 1.97 and 1.98

The prior art relates to wheel rotation devices but which do not comprising a shell having rear vents and a front-facing tube to scoop and direct air over veins attached to a hub of a wheel.

BRIEF SUMMARY OF THE INVENTION

An embodiment of the disclosure meets the needs presented above by generally comprising a disc, a shell, and a tube. The disc has an inner face and an outer face. A coupler is attached to the disc and is configured to couple to a hub of a wheel that is attached to an axle of an aircraft. The coupler is configured to attach the disc to the hub so that the inner face abuts the hub and the axle extends axially through the disc. A plurality of veins is attached to the outer face of the disc. The shell is bowl shaped and thus has an open face, which is circumferentially complementary to the hub. An opening extends axially into the shell and is configured to receive the axle so that the shell is fixedly attached to the axle with the open face being positioned adjacent to the hub. A plurality of slots extends into the shell and is configured to vent the shell. An inlet is positioned in the shell. A tube is attached to the shell and extends from the inlet toward a forward end of the aircraft. The tube is configured to direct air over the plurality of veins so that torque is applied to the hub to rotate the wheel prior to landing of the aircraft.

Another embodiment of the disclosure includes a method of rotating a wheel of an aircraft prior to landing. The method entails provision of the aircraft wheel prelanding rotation device, according to the disclosure above. Upon mounting of the aircraft wheel prelanding rotation device to the axle, air enters into the tube and is directed over the plurality of veins, thereby applying torque to the hub and rotating the wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
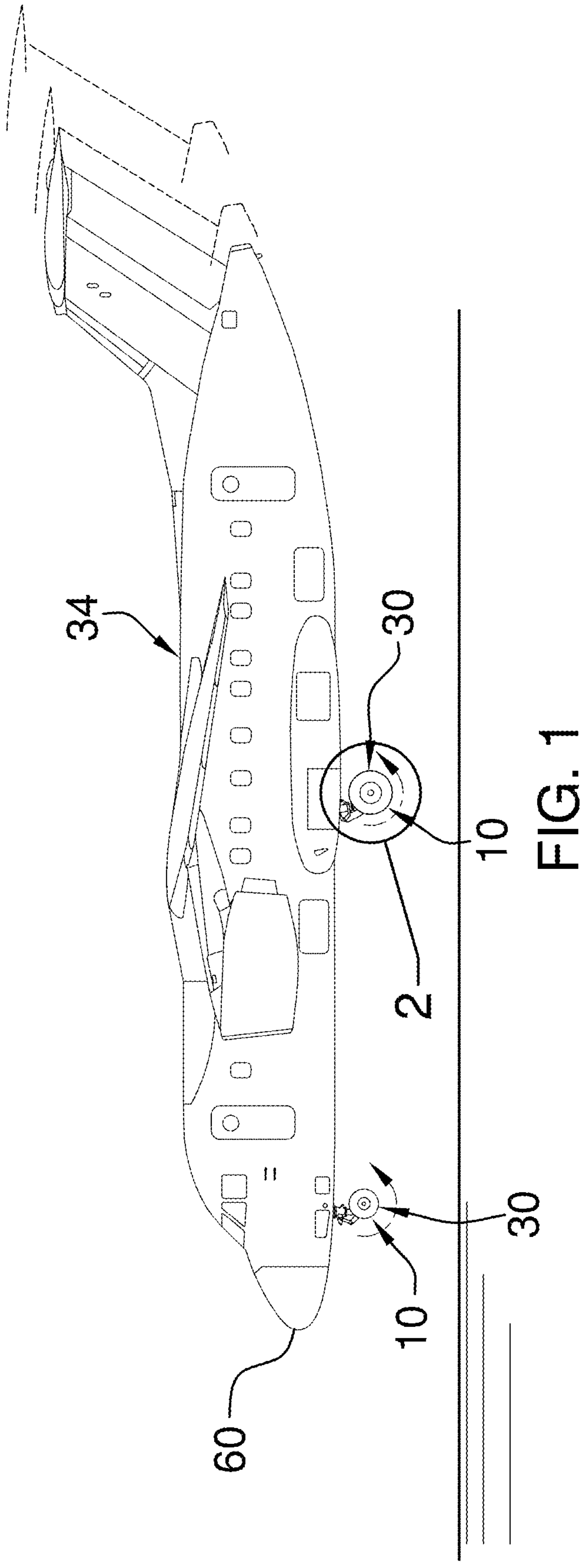
FIG. 1 is an in-use view of an aircraft wheel prelanding rotation device according to an embodiment of the disclosure.
Figure 2:
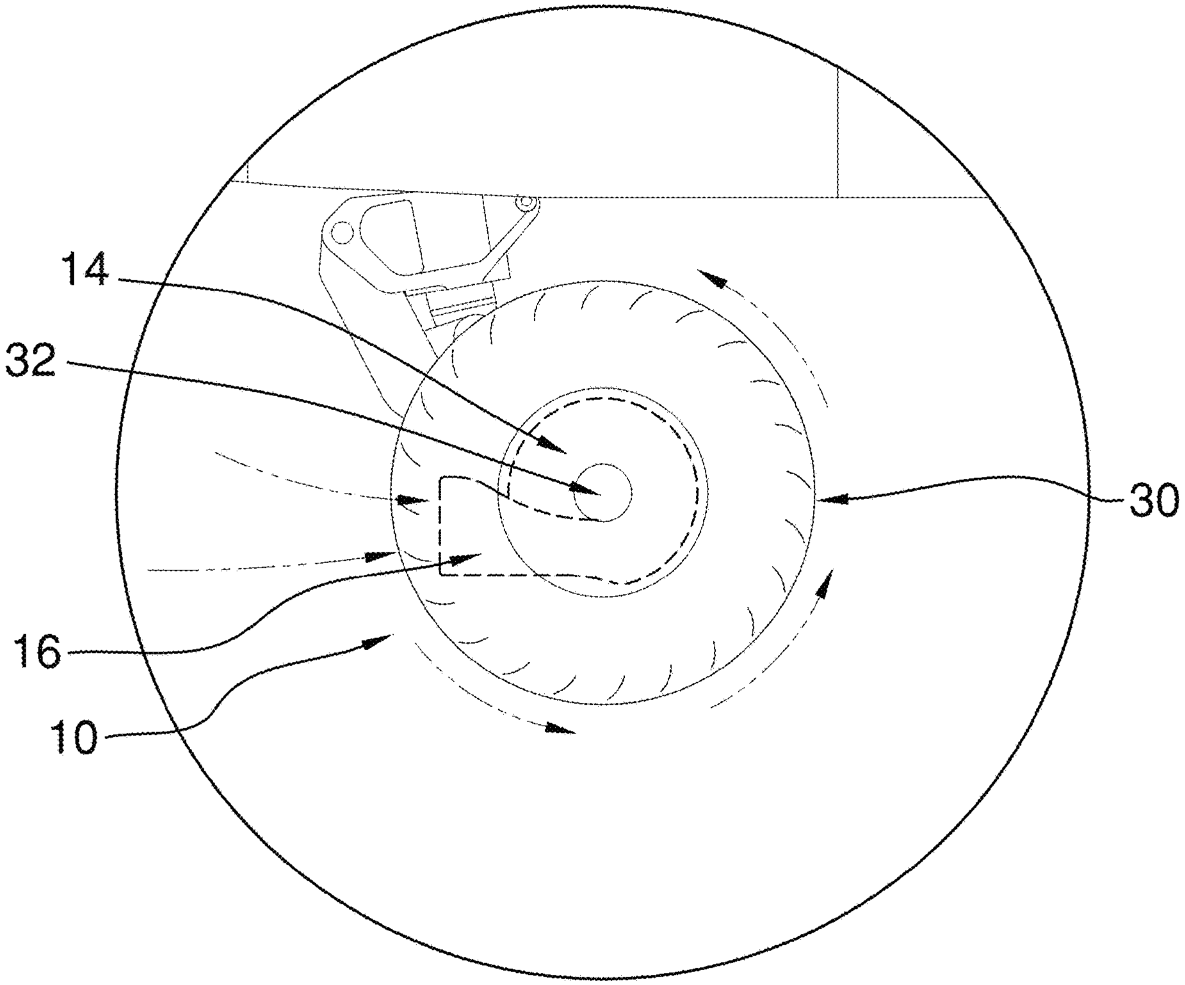
FIG. 2 is a detail view of an embodiment of the disclosure.

With reference now to the drawings, and in particular to FIGS. 1 through 7 thereof, a new wheel rotation device embodying the principles and concepts of an embodiment of the disclosure and generally designated by the reference numeral 10 will be described.

Figure 4:
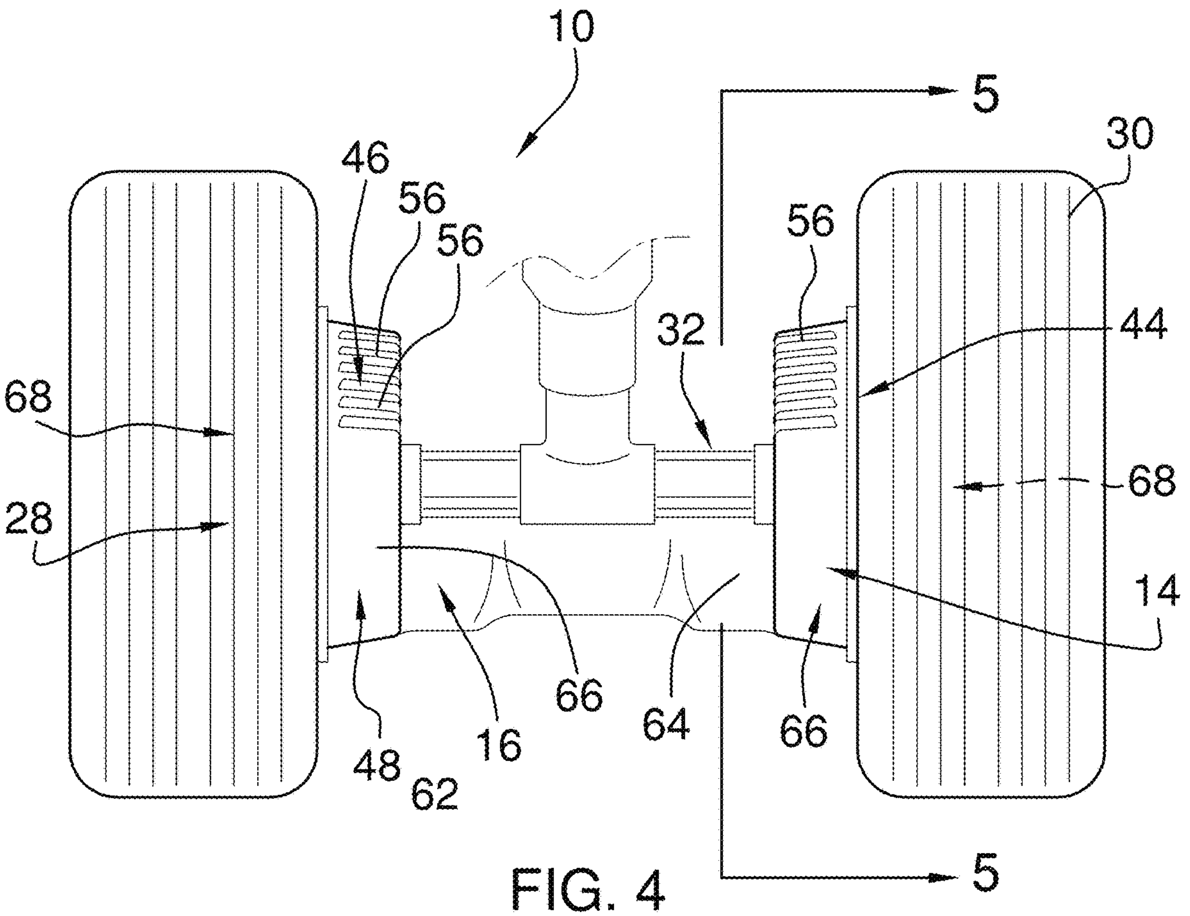
FIG. 4 is a rear view of an embodiment of the disclosure.
Figure 5:
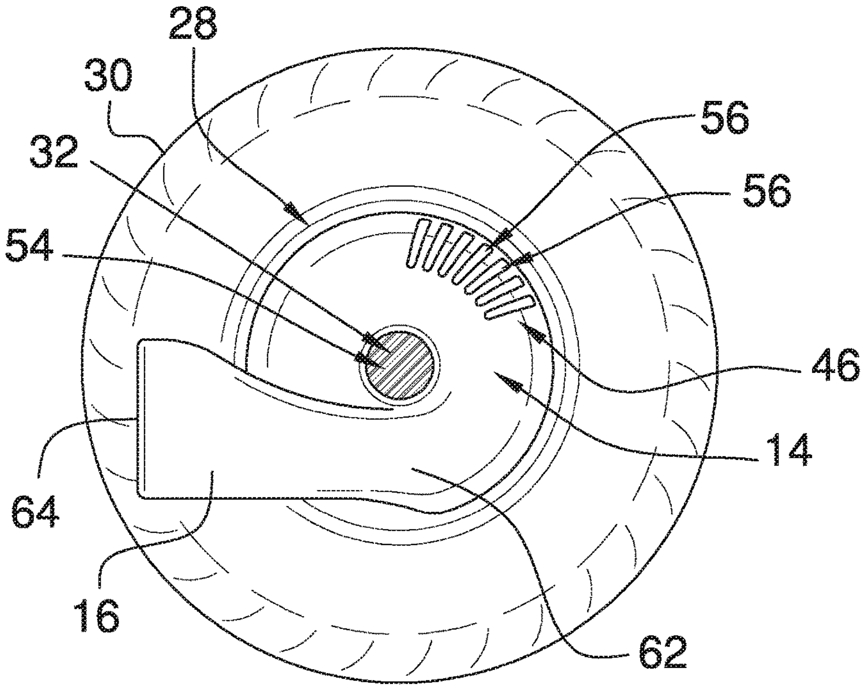
FIG. 5 is a cross-sectional view of an embodiment of the disclosure.
Figure 6:
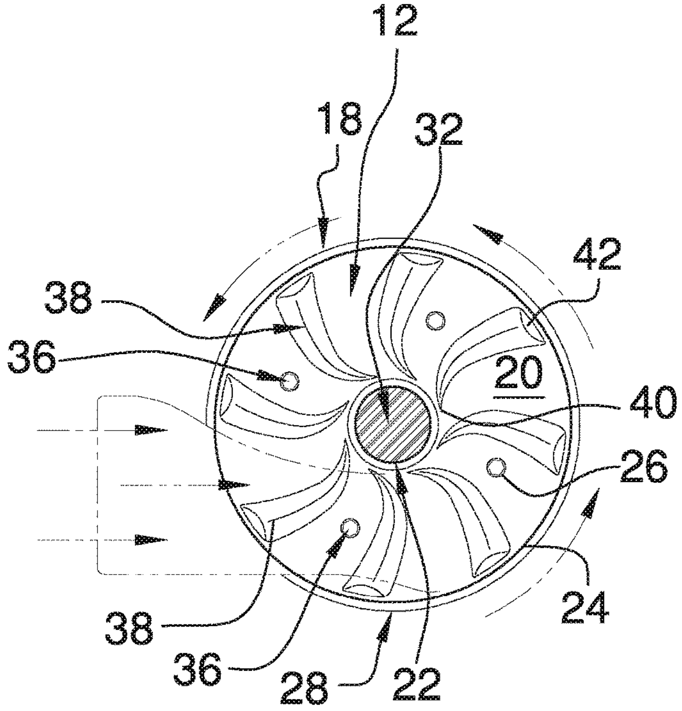
FIG. 6 is a detail view of an embodiment of the disclosure.
Figure 7:
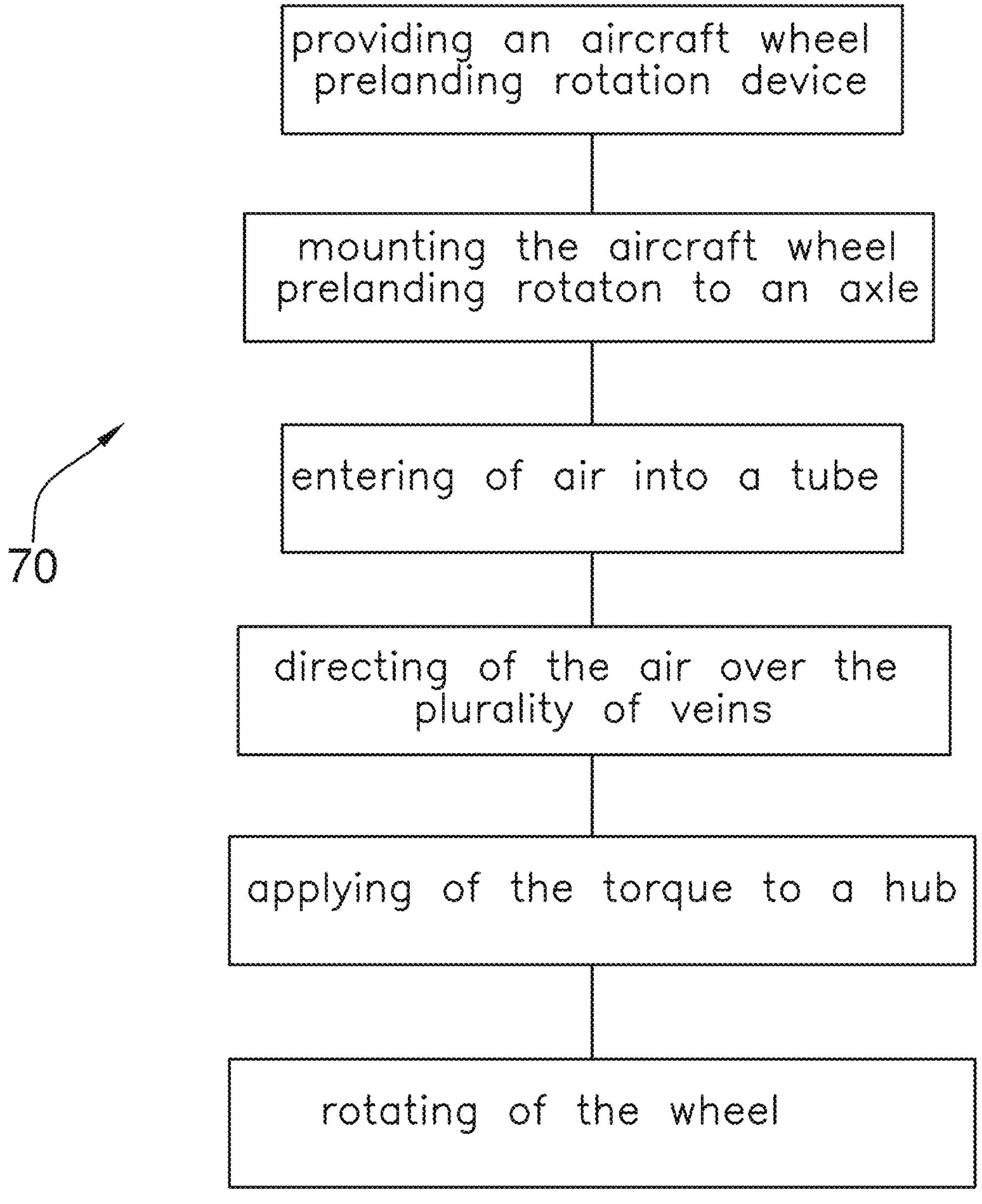
FIG. 7 is a flow diagram for a method utilizing an embodiment of the disclosure.

As best illustrated in FIGS. 1 through 7, the aircraft wheel prelanding rotation device 10 generally comprises a disc 12, a shell 14, and a tube 16. The disc 12 has an inner face 18, an outer face 20, an inner perimeter 22, and an outer perimeter 24. A coupler 26 is attached to the disc 12 and is configured to couple to a hub 28 of a wheel 30 that is attached to an axle 32 of an aircraft 34. The coupler 26 is configured to attach the disc 12 to the hub 28 so that the inner face 18 abuts the hub 28 and the axle 32 extends axially through the disc 12. The coupler 26 may comprise a plurality of holes 36, which extends into the disc 12, as is shown in FIG. 6. Each hole 36 is configured for insertion of a respective bolt (not shown) of a plurality of bolts to mount the disc 12 to the hub 28. The present invention also anticipates the disc 12 being welded to the hub 28.

A plurality of veins 38 is attached to the outer face 20 of the disc 12. The present invention also anticipates the plurality of veins 38 being attached to or integral to the hub 28, in which case the disc 12 would be omitted. The plurality of veins 38 may comprise from four to sixteen veins 38. The plurality of veins 38 also may comprise from six to twelve veins 38. As is shown in FIG. 6, the plurality of veins 38 comprises eight veins 38. Each vein 38 has a first terminus 40, which is positioned proximate to the inner perimeter 22, and a second terminus 42, which is positioned proximate to the outer perimeter 24. The second terminus 42 is circumferentially larger than the first terminus 40 so that the vein 38 tapers from the second terminus 42 to the first terminus 40. The vein 38 also is arcuate for the purpose of catching air, the benefit of which will become apparent below.

The shell 14 is bowl shaped and thus has an open face 44, which is circumferentially complementary to the hub 28. The shell 14 also has an upper rear quadrant 46, a lower rear quadrant 48, an upper front quadrant 50, and a lower front quadrant 52. An opening 54 extends axially into the shell 14 and is configured to receive the axle 32 so that the shell 14 is fixedly attached to the axle 32 with the open face 44 being positioned adjacent to the hub 28. As the axle 32 of landing gear of the aircraft 34 does not rotate, it need not be circularly shaped except where the hub 28 is attached. Thus, a noncircular axle 32 inserted through the opening 54, with the opening 54 being complementarily shaped, would effectively attach the shell 14 to the axle 32. The present invention also anticipates the shell 14 being welded to the axle 32.

A plurality of slots 56 extends into the shell 14 and is configured to vent the shell 14. As is shown in FIG. 5, the plurality of slots 56 is positioned in the upper rear quadrant 46. An inlet 58 is positioned in the shell 14. As is shown in FIG. 5, the inlet 58 is positioned in one or both of the lower front quadrant 52 and the lower rear quadrant 48. The tube 16 is attached to the shell 14 and extends from the inlet 58 toward a forward end 60 of the aircraft 34. The tube 16 is configured to direct air over the plurality of veins 38 so that torque is applied to the hub 28 to rotate the wheel 30 prior to landing of the aircraft 34. The tube 16 has a first end 62, which is attached to the shell 14, and a second end 64. The second end 64 is circumferentially larger than the first end 62 and the tube 16 thus is configured to accelerate the air entering the second end 64.

Figure 3:
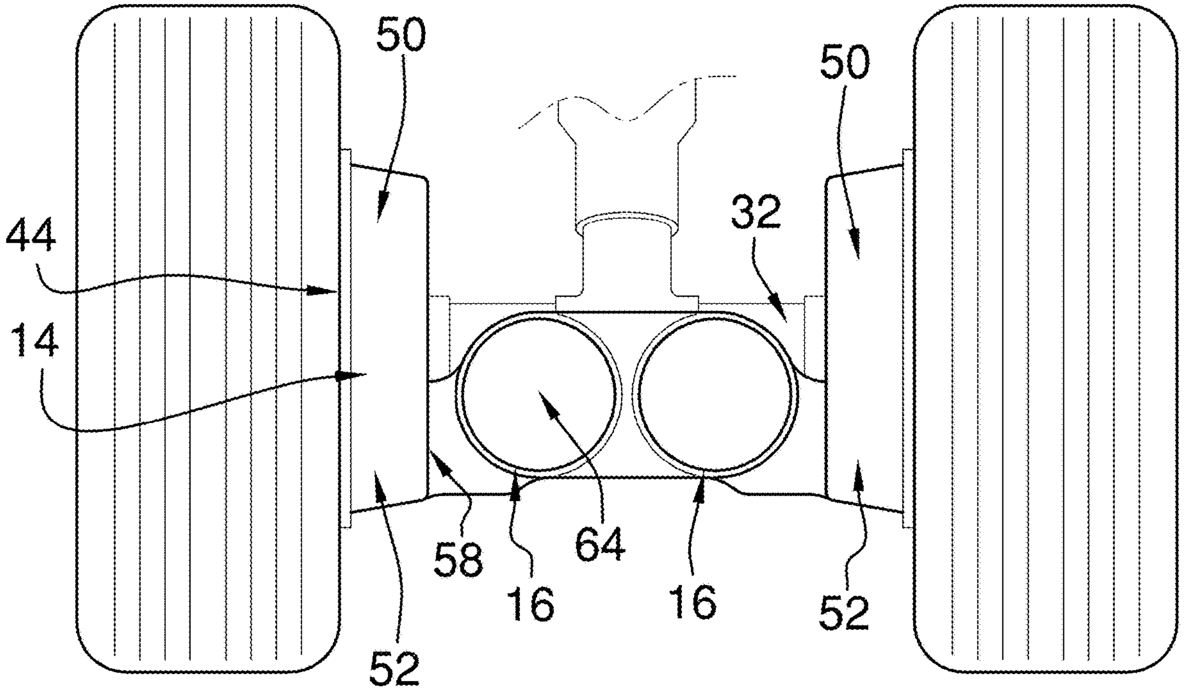
FIG. 3 is a front view of an embodiment of the disclosure.

As described above, the aircraft wheel prelanding rotation device 10 is configured for attachment to an axle 32 bearing one wheel 30. The present invention also anticipates the shell 14 being one of a pair of shells 14, the tube 16 being one of a pair of tubes 16, and the pair of shells 14 and the pair of tubes 16 forming an integral structure 66. The integral structure 66 is configured to mount to an axle 32 bearing a pair of hubs 28 mounted singly to opposed ends 68 of the axle 32, as is shown in FIGS. 3 and 4.

In use, the aircraft wheel prelanding rotation device 10 enables a method of rotating a wheel of an aircraft prior to landing 70. The method 70 entails provision of the aircraft wheel prelanding rotation device 10, according to the specification above. Upon mounting of the aircraft wheel prelanding rotation device 10 to the axle 32, air enters into the tube 16 and is directed over the plurality of veins 38, thereby applying torque to the hub 28 and rotating the wheel 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aircraft wheel prelanding rotation device comprising:
- a disc having an inner face and an outer face;
- a coupler being attached to the disc and being configured for coupling to a hub of a wheel attached to an axle of an aircraft, wherein the coupler is configured for attaching the disc to the hub such that the inner face abuts the hub and the axle extends axially through the disc;
- a plurality of veins being attached to the outer face of the disc;
- a shell, the shell being bowl shaped such that the shell has an open face, the open face being circumferentially complementary to the hub;
- an opening extending axially into the shell, wherein the opening is configured for receiving the axle such that the shell is fixedly attached to the axle and such that the open face is positioned adjacent to the hub;
- a plurality of slots extending into the shell, wherein the plurality of slots is configured for venting of the shell;
- an inlet being positioned in the shell; and
- a tube being attached to the shell and extending from the inlet toward a forward end of the aircraft, wherein the tube is configured for directing air over the plurality of veins such that torque is applied to the hub for rotating the wheel prior to landing of the aircraft.

2. The aircraft wheel prelanding rotation device of claim 1, wherein the coupler comprises a plurality of holes extending into the disc, wherein each hole of the plurality of holes is configured for insertion of a respective bolt of a plurality of bolts for mounting the disc to the hub.

3. The aircraft wheel prelanding rotation device of claim 1, wherein the plurality of veins comprises from four to sixteen veins.

4. The aircraft wheel prelanding rotation device of claim 1, wherein the plurality of veins comprises from six to twelve veins.

5. The aircraft wheel prelanding rotation device of claim 1, wherein the plurality of veins comprises eight veins.

6. The aircraft wheel prelanding rotation device of claim 1, wherein:
- the disc has an inner perimeter, and an outer perimeter; and
- each vein has a first terminus positioned proximate to the inner perimeter and a second terminus positioned proximate to the outer perimeter, the second terminus being circumferentially larger than the first terminus such that the vein tapers from the second terminus to the first terminus.

7. The aircraft wheel prelanding rotation device of claim 6, wherein the vein is arcuate.

8. The aircraft wheel prelanding rotation device of claim 1, wherein:

the shell has an upper rear quadrant, a lower rear quadrant, an upper front quadrant, and a lower front quadrant;

the plurality of slots is positioned in the upper rear quadrant; and the inlet is positioned in one or both of the lower front quadrant and the lower rear quadrant.

9. The aircraft wheel prelanding rotation device of claim 1, wherein the tube has a first end and a second end, the first end being attached to the shell, the second end being circumferentially larger than the first end, wherein the tube is configured for accelerating air entering the second end.

10. The aircraft wheel prelanding rotation device of claim 1, further including:

the shell being one of a pair of shells;

the tube being one of a pair of tubes; and the pair of shells and the pair of tubes forming an integral structure, wherein the integral structure is configured for mounting to an axle bearing a pair of hubs mounted singly to opposed ends of the axle.

11. An aircraft wheel prelanding rotation device comprising:

a disc having an inner face, an outer face, an inner perimeter, and an outer perimeter;

a coupler being attached to the disc and being configured for coupling to a hub of a wheel attached to an axle of an aircraft, wherein the coupler is configured for attaching the disc to the hub such that the inner face abuts the hub and the axle extends axially through the disc, the coupler comprising a plurality of holes extending into the disc, wherein each hole of the plurality of holes is configured for insertion of a respective bolt of a plurality of bolts for mounting the disc to the hub;

a plurality of veins being attached to the outer face of the disc, the plurality of veins comprising from four to sixteen veins, the plurality of veins comprising from six to twelve veins, the plurality of veins comprising eight veins, each vein having a first terminus positioned proximate to the inner perimeter and a second terminus positioned proximate to the outer perimeter, the second terminus being circumferentially larger than the first terminus such that the vein tapers from the second terminus to the first terminus, the vein being arcuate;

a shell, the shell being bowl shaped such that the shell has an open face, the open face being circumferentially complementary to the hub, the shell having an upper rear quadrant, a lower rear quadrant, an upper front quadrant, and a lower front quadrant;

an opening extending axially into the shell, wherein the opening is configured for receiving the axle such that the shell is fixedly attached to the axle and such that the open face is positioned adjacent to the hub;

a plurality of slots extending into the shell, wherein the plurality of slots is configured for venting of the shell, the plurality of slots being positioned in the upper rear quadrant;

an inlet being positioned in the shell, the inlet being positioned in one or both of the lower front quadrant and the lower rear quadrant;

a tube being attached to the shell and extending from the inlet toward a forward end of the aircraft, wherein the tube is configured for directing air over the plurality of veins such that torque is applied to the hub for rotating the wheel prior to landing of the aircraft, the tube having a first end and a second end, the first end being attached to the shell, the second end being circumferentially larger than the first end, wherein the tube is configured for accelerating air entering the second end; and the shell being one of a pair of shells, the tube being one of a pair of tubes, the pair of shells and the pair of tubes forming an integral structure, wherein the integral structure is configured for mounting to an axle bearing a pair of hubs mounted singly to opposed ends of the axle.

12. A method of rotating a wheel of an aircraft prior to landing, the method comprising the steps of:

providing an aircraft wheel prelanding rotation device comprising:

a disc having an inner face and an outer face;

a coupler being attached to the disc and being configured for coupling to a hub of a wheel attached to an axle of an aircraft, wherein the coupler is configured for attaching the disc to the hub such that the inner face abuts the hub and the axle extends axially through the disc;

a plurality of veins being attached to the outer face of the disc;

a shell, the shell being bowl shaped such that the shell has an open face, the open face being circumferentially complementary to the hub;

an opening extending axially into the shell, wherein the opening is configured for receiving the axle such that the shell is fixedly attached to the axle and such that the open face is positioned adjacent to the hub;

a plurality of slots extending into the shell, wherein the plurality of slots is configured for venting of the shell;

an inlet being positioned in the shell; and a tube being attached to the shell and extending from the inlet toward a forward end of the aircraft, wherein the tube is configured for directing air over the plurality of veins such that torque is applied to the hub for rotating the wheel prior to landing of the aircraft;

mounting the aircraft wheel prelanding rotation to the axle;

entering of air into the tube;

directing of the air over the plurality of veins;

applying of the torque to the hub; and rotating of the wheel.

* * * * *